United States Patent
Huang et al.

(10) Patent No.: US 11,846,932 B2
(45) Date of Patent: Dec. 19, 2023

(54) PART PROCESSING PLANNING METHOD, PART PROCESSING PLANNING SYSTEM USING THE SAME, PART ASSEMBLY PLANNING METHOD, PART ASSEMBLY PLANNING SYSTEM USING THE SAME, AND COMPUTER PROGRAM PRODUCT THEREOF

(71) Applicant: INDUSTRIAL TECHNOLOGY RESEARCH INSTITUTE, Hsinchu (TW)

(72) Inventors: Yi-Ping Huang, Taoyuan (TW); Hsuan-Yu Huang, Chiayi (TW); Shu-Hui Yang, Taichung (TW); Po-Nien Tsou, Tainan (TW); Ming-Cheng Tsai, New Taipei (TW); Chen-Kun Tsung, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1027 days.

(21) Appl. No.: 16/727,662

(22) Filed: Dec. 26, 2019

(65) Prior Publication Data
US 2021/0003997 A1 Jan. 7, 2021

Related U.S. Application Data

(60) Provisional application No. 62/870,829, filed on Jul. 5, 2019.

(30) Foreign Application Priority Data
Nov. 1, 2019 (TW) ................................. 108139710

(51) Int. Cl.
*G05B 19/418* (2006.01)

(52) U.S. Cl.
CPC ............... *G05B 19/41865* (2013.01); *G05B 2219/35228* (2013.01); *G05B 2219/37617* (2013.01)

(58) Field of Classification Search
CPC .................... G05B 19/41865; G06F 17/50
See application file for complete search history.

(56) References Cited

U.S. PATENT DOCUMENTS 5,189,624 A * 2/1993 Barlow .............. G05B 19/4065
700/169
5,323,333 A * 6/1994 Johnson ............. G05B 19/4097
703/1

(Continued)

FOREIGN PATENT DOCUMENTS

| CN | 101710355 A | 5/2010 |
| CN | 101982821 A | 3/2011 |

(Continued)

OTHER PUBLICATIONS

Taiwanese Office Action and Search Report, dated Apr. 6, 2021, for Taiwanese Application No. 108139710.

(Continued)

*Primary Examiner* — Ricky Go
(74) *Attorney, Agent, or Firm* — Birch, Stewart, Kolasch & Birch, LLP

(57) ABSTRACT

A part processing planning method includes the following steps. Firstly, a specific tolerance of a nominal size of a part is obtained. Then, a predetermined tolerance of each of processes is obtained. Then, using a process dimension chain establishing technique, at least one predetermined tolerance associated with the specification tolerance from the predetermined tolerances is obtained. Then, at least one predetermined tolerance associated with the specification tolerance is accumulated to obtain a size cumulative tolerance. Then, whether the size cumulative tolerance meets the (Continued)

specification tolerance is determined. Then, at least one predetermined tolerance associated with the specification tolerance is re-allocated when the cumulative tolerance does not meet the specification tolerance, such that the size cumulative tolerance is within the specification tolerance.

18 Claims, 9 Drawing Sheets

(56) References Cited

U.S. PATENT DOCUMENTS

| | | | |
|---|---|---|---|
| 5,983,194 A * | 11/1999 | Hogge | G06Q 10/06315 |
| | | | 700/117 |
| 6,065,200 A * | 5/2000 | Negre | B23K 37/047 |
| | | | 29/430 |
| 6,243,614 B1 | 6/2001 | Anderson | |
| 6,963,824 B1 | 11/2005 | Davidson et al. | |
| 7,239,991 B2 | 7/2007 | Tuszynski | |
| 8,768,500 B2 | 7/2014 | Tuszynski | |
| 9,238,554 B2 | 1/2016 | Chang et al. | |
| 2003/0083762 A1 * | 5/2003 | Farrah | G06Q 10/06 |
| | | | 700/103 |
| 2006/0129259 A1 | 6/2006 | Tornquist et al. | |
| 2006/0129267 A1 * | 6/2006 | Laquerbe | B24B 47/22 |
| | | | 700/173 |
| 2010/0185310 A1 | 7/2010 | Miyata et al. | |

FOREIGN PATENT DOCUMENTS

| | | |
|---|---|---|
| CN | 102622480 A | 8/2012 |
| CN | 103903060 A | 7/2014 |
| CN | 105302988 A | 2/2016 |
| CN | 106020147 A | 10/2016 |
| CN | 106096099 A | 11/2016 |
| EP | 1645924 A1 | 4/2006 |
| TW | I307455 | 3/2009 |
| TW | 201423458 A | 6/2014 |
| TW | 201423459 A | 6/2014 |

OTHER PUBLICATIONS

Dorigo et al., "Ant Colony Optimization: A New Meta-Heuristic." Proceedings of the 1999 Congress on Evolutionary Computation-CEC99, Jul. 6-9, 1999, pp. 1470-1477.

Hao et al., "A new reliablity-based design optimization framework using isogeometric analysis." Comput. Methods Appl. Mech. Engrg., vol. 345. 2019, pp. 476-501.

Kang et al., "Accuracy Improvement of the Most Probable Point-based Dimension Reduction Method Using the Hessian Matrix," International Journal for Numerical Methods in Engineering, vol. 111, Issue 3, Oct. 25, 2016, 32 pages.

Li et al., "No Pane, No Gain: Efficient Evaluation of Sliding-Window Aggregates over Data Streams," SIGMOD Record, vol. 34, No. 1, Mar. 2005, pp. 39-44.

Lin et al., "Study of an assembly tolerance allocation model based on Monte Carlo simulation," Journal of Materials Processing Technology, vol. 70, 1997, pp. 9-16.

Wasik et al., "Machining accuracy improvement by compensation of machine and workpiece deformation," Procedia Manufacturing, vol. 11, 2017, pp. 2187-2194.

* cited by examiner

PART PROCESSING PLANNING METHOD, PART PROCESSING PLANNING SYSTEM USING THE SAME, PART ASSEMBLY PLANNING METHOD, PART ASSEMBLY PLANNING SYSTEM USING THE SAME, AND COMPUTER PROGRAM PRODUCT THEREOF

This application claims the benefit of U.S. provisional application Ser. No. 62/870,829, filed Jul. 5, 2019, and Taiwan application Serial No. 108139710, filed Nov. 1, 2019, the subject matters of which are incorporated herein by references.

TECHNICAL FIELD

The disclosure relates to a processing planning method, a processing planning system using the same, an assembly planning method, an assembly planning system using the same, and a computer program product thereof, and the disclosure particularly relates to a processing planning method for a part, a processing planning system for a part using the same, an assembly planning method for a part, an assembly planning system for a part using the same, and a computer program product for a part thereof.

BACKGROUND

In the conventional method, after a number of first parts and a number of second parts are processed, the first parts and the second parts are measured. Then, one of the first parts and one of the second parts which meet specification tolerance are selected to be assembled. However, such an assembly method could only be applied to parts that meet the specification tolerances, and parts that do not meet the specification tolerances could only be scrapped.

Therefore, obtaining a method capable of improving the fit rate has become one of the goals of the industry's efforts.

SUMMARY

According to one embodiment of this disclosure, a part processing planning method, performed by computer operations, is provided. The part processing planning method includes the following steps: obtaining a specification tolerance of a nominal size of a part; obtaining a predetermined tolerance of each of a plurality of machining procedures; from the predetermined tolerances, obtaining at least one of the predetermined tolerances associated with the specification tolerance by using a dimensional chain establishing technology; accumulating the at least one of the predetermined tolerances associated with the specification tolerances to obtain a size cumulative tolerance; determining whether the size cumulative tolerance meets the specification tolerance; and re-allocating the associated predetermined tolerance when the size cumulative tolerance does not meet the specification tolerance, such that the size cumulative tolerance meets the specification tolerance.

According to another embodiment of this disclosure, a part processing planning system is provided. The part processing planning system includes a processing information acquirer and a processing information planner. The processing information acquirer is configured to obtain a specification tolerance of a nominal size of a part and obtain a predetermined tolerance of each of a plurality of machining procedures. The processing information planner configured to from the predetermined tolerances, obtain at least one of the predetermined tolerances associated with the specification tolerance by using a dimensional chain establishing technology; accumulate the at least one of the predetermined tolerances associated with the specification tolerances to obtain a size cumulative tolerance; determine whether the size cumulative tolerance meets the specification tolerance; and re-allocate the associated predetermined tolerance when the size cumulative tolerance does not meet the specification tolerance, such that the size cumulative tolerance meets the specification tolerance.

According to one embodiment of this disclosure, a part assembly planning method, performed by computer operations, is provided. The part assembly planning method includes the following steps: obtaining a first measurement size of each of a plurality of first parts and a second measurement size of each of a plurality of second parts, wherein each first part has the same first nominal size and the same first specification tolerance, and each second part has the same second nominal size and the same second specification tolerance; removing the second part whose second measurement size does not meet the second specification tolerance and cannot be fitted with any first measurement size; temporarily removing the first part whose first measurement size is closest to the first nominal size; and performing a fit analysis of the first measurement sizes and the second measurement sizes for the second parts that are not removed and the first parts that are not temporarily removed.

According to another embodiment of this disclosure, a part assembly planning system is provided. The part assembly planning system includes a measurement size acquirer and an assembly planner. The measurement size acquirer is configured to obtain a first measurement size of each of a plurality of first parts and a second measurement size of each of a plurality of second parts, wherein each first part has the same first nominal size and the same first specification tolerance, and each second part has the same second nominal size and the same second specification tolerance. The assembly planner configured to remove the second part whose second measurement size does not meet the second specification tolerance and cannot be fitted with any first measurement size; temporarily remove the first part whose first measurement size is closest to the first nominal size; and perform a fit analysis of the first measurement sizes and the second measurement sizes for the second parts that are not removed and the first parts that are not temporarily removed.

According to another embodiment of this disclosure, a non-transitory computer readable medium storing a program causing a part processing planning system to execute a part processing planning method. The part processing planning method includes the following steps: obtaining a specification tolerance of a nominal size of a part; obtaining a predetermined tolerance of each of a plurality of machining procedures; from the predetermined tolerances, obtaining at least one of the predetermined tolerances associated with the specification tolerance by using a dimensional chain establishing technology; accumulating the at least one of the predetermined tolerances associated with the specification tolerances to obtain a size cumulative tolerance; determining whether the size cumulative tolerance meets the specification tolerance; and re-allocating the associated predetermined tolerance when the size cumulative tolerance does not meet the specification tolerance, such that the size cumulative tolerance meets the specification tolerance.

According to another embodiment of this disclosure, a non-transitory computer readable medium storing a program causing a part assembly planning to execute a part assembly planning method. The part assembly planning method includes the following steps: obtaining a first measurement size of each of a plurality of first parts and a second measurement size of each of a plurality of second parts, wherein each first part has the same first nominal size and the same first specification tolerance, and each second part has the same second nominal size and the same second specification tolerance; removing the second part whose second measurement size does not meet the second specification tolerance and cannot be fitted with any first measurement size; temporarily removing the first part whose first measurement size is closest to the first nominal size; and performing a fit analysis of the first measurement sizes and the second measurement sizes for the second parts that are not removed and the first parts that are not temporarily removed.

The above and other aspects of this disclosure will become better understood with regard to the following detailed description of the preferred but non-limiting embodiments. The following description is made with reference to the accompanying drawings.

Figures 1, 2:
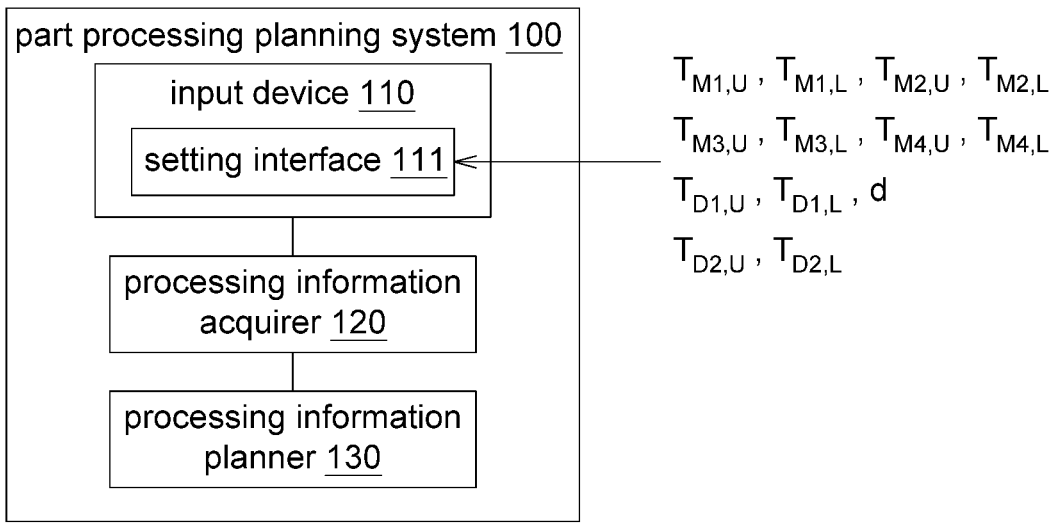
FIG. 1 is a functional block diagram of a part processing planning system according to an embodiment of the disclosure.
FIG. 2 is a schematic diagram of a setting interface according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 3:
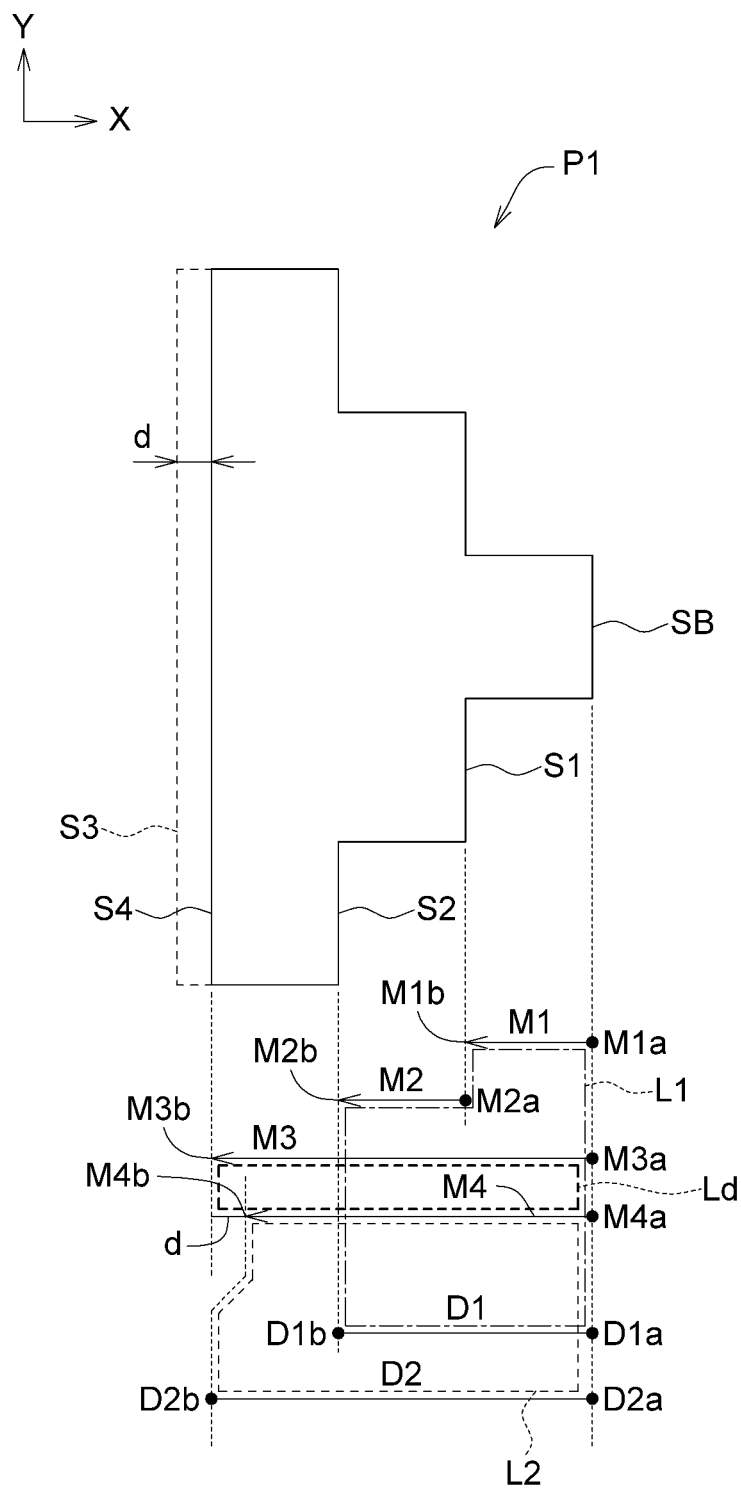
FIG. 3 is a schematic diagram of a to-be-planned first part according to an embodiment of the present disclosure.

Referring to FIGS. 1 to 3, FIG. 1 is a functional block diagram of a part processing planning system 100 according to an embodiment of the disclosure, FIG. 2 is a schematic diagram of a setting interface 111 according to an embodiment of the disclosure, and FIG. 3 is a schematic diagram of a to-be-planned first part P1 according to an embodiment of the present disclosure.

As shown in FIG. 1, the part processing planning system 100 includes an input device 110, a processing information acquirer 120, and a processing information planner 130. The input device 110 is, for example, a display, a keyboard, a touch panel, a mouse, or a combination thereof, or other device that could receive input from an operator. The input device 110 could provide a setting interface 111 to receive operator's input. When the input device 110 is a display, the setting interface 111 is a setting screen provided by the input device 110. The processing information acquirer 120 and/or the processing information planner 130 is, for example, a circuit structure formed by a semiconductor process. The processing information acquirer 120 and the processing information planner 130 may be integrated into a single component, such as a processor, or at least one of the processing information acquirer 120 and the processing information planner 130 may be integrated into the processor.

The operator could input a specification tolerance of a nominal size of the first part P1 and a predetermined tolerance of each of a number of machining procedures (or processing procedures) M through the setting interface 111. The processing information acquirer 120 is configured to: (1) obtain the specification tolerance of the nominal size of the first part P1; and (2) obtain a predetermined tolerance of each machining procedure. The processing information planner 130 is configured to: (1) using a dimensional chain establishing technology, obtain at least one predetermined tolerance, associated with the specification tolerance, of the predetermined tolerances; (2) accumulate the related at least one predetermined tolerance to obtain a size cumulative tolerance; and (3) determine whether the size cumulative tolerance meets the specification tolerance; and (4) when the size cumulative tolerance does not meet the specification tolerance, re-allocate the related at least one predetermined tolerance so that the size cumulative tolerance meets the specification tolerance.

In summary, before the first part P1 is actually processed, the part processing planning system 100 could pre-plan the predetermined tolerance of the nominal size of each first part P1 by computer operation/calculation, so that the predetermined tolerance of the nominal size meets the specification tolerances of the design requirement (for example, design drawing) for improving the yield of the finished product (or end product).

In the present embodiment, as shown in FIG. 3, the first part P1 is represented by two nominal sizes, such as a first nominal size D1 and a second nominal size D2. However, the disclosed embodiment does not limit the number of nominal sizes and the marked location. In addition, the specification tolerance of each nominal size includes, for example, an upper deviation and a lower deviation. For example, as shown in FIG. 1, the specification tolerance of the first nominal size D1 includes an upper deviation $T_{D1,\,U}$ and a lower deviation $T_{D1,\,L}$, and the specification tolerance of the second nominal size D2 includes an upper deviation $T_{D2,\,U}$ and a lower deviation $T_{D1,\,L}$. As shown in FIG. 1, each predetermined tolerance includes, for example, an upper deviation and a lower deviation. For example, the predetermined tolerance of the first machining procedure M1 includes an upper deviation $T_{M1,\,U}$ and a lower deviation $T_{M1,\,L}$. The predetermined tolerance of the second machining procedure M2 includes an upper deviation $T_{M2,\,U}$ and a lower deviation $T_{M2,\,L}$, and the predetermined tolerance of the third machining procedure M3 includes an upper deviation $T_{M3,\,U}$ and a lower deviation $T_{M3,\,L}$, and the predetermined tolerance of the fourth machining procedure M4 includes an upper deviation $T_{M4, U}$ and a lower deviation $T_{M4, L}$.

In an embodiment, the upper deviation of the predetermined tolerance is, for example, a positive deviation, and the lower deviation of the predetermined tolerance is, for example, a negative deviation. Alternatively, the upper deviation and the lower deviation of the predetermined tolerance are both the positive deviations or the negative deviations. In addition, the absolute value of the upper deviation of the predetermined tolerance might be equal to the absolute value of the lower deviation, but might also be different.

Figure 4A:
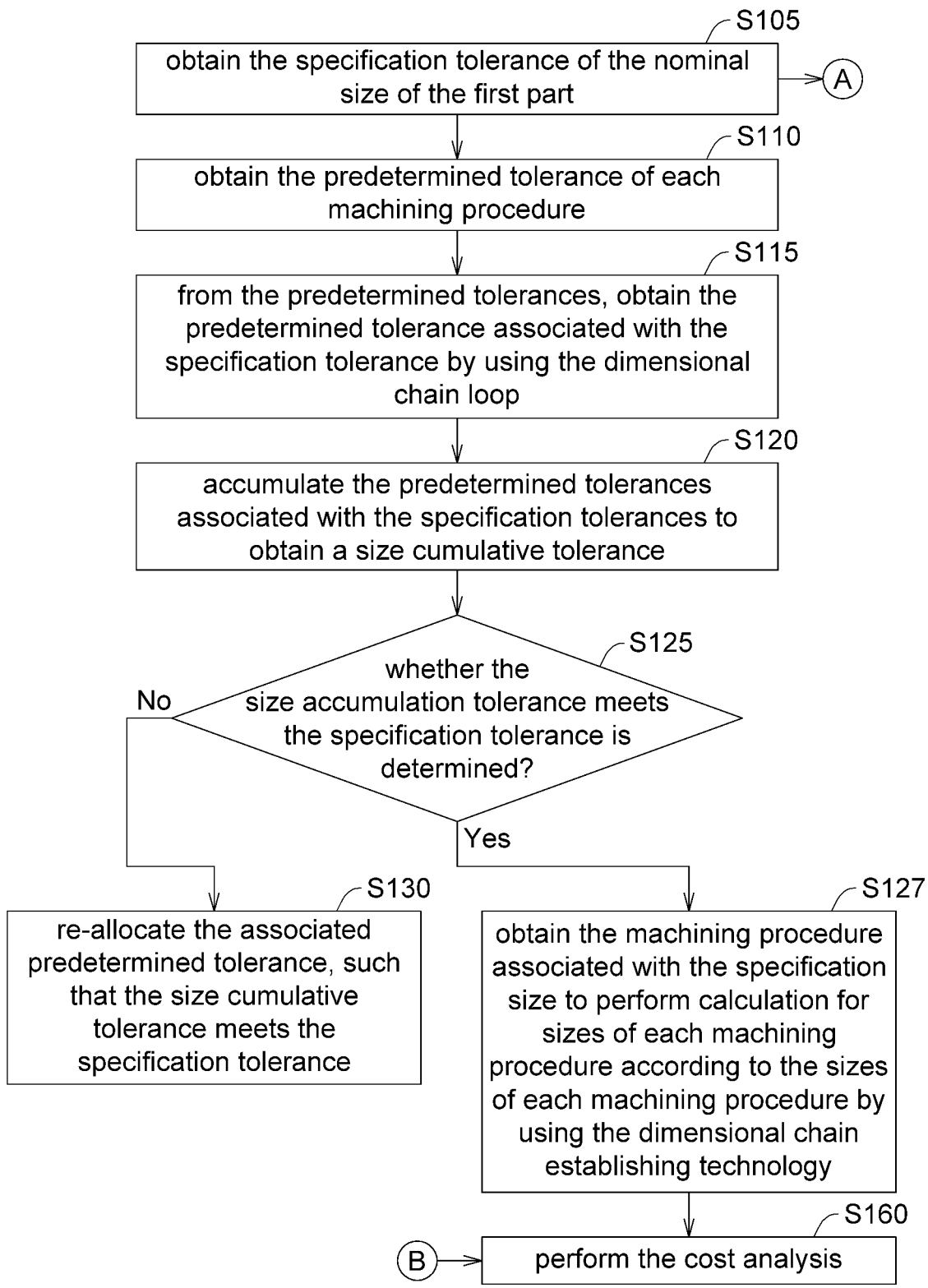
FIGS. 4A and 4B are a flow chart showing a part processing planning method of the part processing planning system for a part of FIG. 1.
Figure 4B:
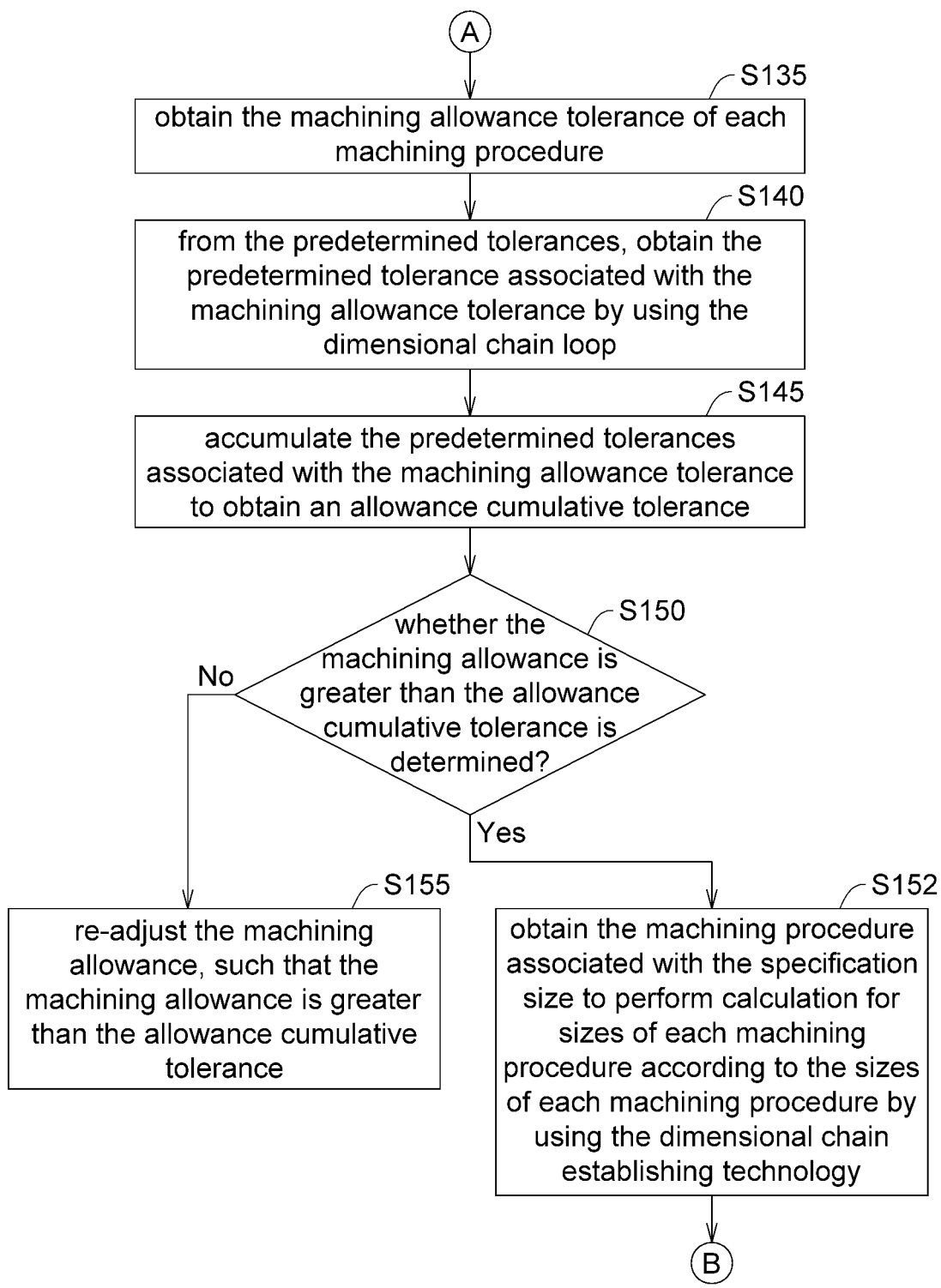

Referring to FIGS. 4A and 4B, FIGS. 4A and 4B are a flow chart showing a part processing planning method of the part processing planning system 100 for a part of FIG. 1.

In step S105, the processing information acquirer 120 obtains the specification tolerance of the nominal size of the first part P1. In this embodiment, the operator could first set the specification tolerance of the nominal size of the first part P1 through the setting interface 111. For example, the specification tolerance of the first nominal size D1 of FIG. 3 is input through the setting interface 111, for example, the upper deviation $T_{D1, U}$ and the lower deviation $T_{D1, L}$, and the second nominal size D2, the upper deviation $T_{D2, U}$ and lower deviation $T_{D2, L}$. Then, the processing information acquirer 120 could obtain the set parameters through/from the setting interface 111.

As shown in FIG. 2, the operator could also set the machining method, the machine number, the measurement reference surface, the machining surface, the machining direction, the machining allowance, the predetermined tolerance, etc. for each machining procedure of the first part P1 through the setting interface 111. The machining method is, for example, turning, milling, grinding or other various machining methods. The machine number is, for example, a machine tool that could perform the aforementioned machining method, wherein different machine numbers represents machine tools of different functions or machine tools of the same function with different machining accuracy. The measurement reference surface is the machining reference surface of the part in each process. The machined surface is the surface on which the part is machined in each machining procedure. The machining direction could be the tool feed direction for machining the machined surface. The machining allowance is, for example, a reserve for finishing. The predetermined tolerance indicates the machining accuracy that the machining procedure could achieve based on machining capabilities, which is associated with the machining method, the machine type, and/or the length of the machining path.

In another embodiment, the processing information acquirer 120 could also obtain the set parameters, such as the required set values for the foregoing setting interface 111 required to complete the part processing planning method of the embodiment of the present disclosure from the big data database in the Internet or the cloud. In other embodiments, the processing information acquirer 120 could obtain the parameters required to complete the part processing planning method of the embodiment of the present disclosure from the big data database in the Internet or the cloud, and then automatically display it in the setting interface 111. In the present embodiment, the operator could manually adjust these automatic set values.

In step S110, after the setting of the setting interface 111 is completed, the processing information acquirer 120 obtains the predetermined tolerance of each machining procedure through the setting interface 111. As shown in FIG. 3, the manufacturing for the first part P1 of the embodiment of the present disclosure is completed by taking four machining procedures as an example, such as the first machining procedure M1, the second machining procedure M2, the third machining procedure M3 and the fourth machining procedure M4. The disclosed embodiments do not limit the number of machining procedures. The number of processes might be two, three, five or more depending on the demand/processing plan.

As shown in FIG. 3, in the first machining procedure M1, the first machining surface S1 is machined with reference to the measurement reference surface SB, wherein the point M1a represents the measurement reference surface SB, and the arrow M1b represents the first machining surface S1. In the second machining procedure M2, the second processed surface S2 is machined with reference to the first processed surface S1, wherein the point M2a represents the first processed surface S1 and the arrow M2b represents the second processed surface S2. In the third machining procedure M3, the third machining surface S3 is machined with reference to the measurement reference surface SB, wherein the point M3a represents the measurement reference surface SB, and the arrow M3b represents the third processing surface S3. In the fourth machining procedure M4, the fourth machining surface S4 is machined with reference to the measurement reference surface SB, wherein the point M4a represents the measurement reference surface SB, and the arrow M4b represents the fourth processing surface S4. The size of the third machining surface S3 to the fourth machining surface S4 is the machining allowance d. According to the part processing plan, the first machining procedure M1 to the fourth machining procedure M4 are sequentially performed to sequentially complete/form the first machining surface S1, the second machining surface S2, the third machining surface S3 and the fourth machining surface S4, wherein after the third processing surface S3 is completed, the first part P1 retains the machining allowance d, and then the machining allowance d is cut/removed in the fourth machining procedure M4 to form the fourth machining surface S4.

In step S115, using the dimensional chain establishing technology, from the predetermined tolerances, at least one predetermined tolerance associated with the specification tolerance is obtained. In the present embodiment, as shown in FIG. 3, the processing information planner 130 could use the loop method to establish a dimensional chain loop of the first nominal size D1 and the second nominal size D2, and then obtain a predetermined tolerance associated with the specification tolerance according to the dimensional chain loop.

For example, in the first loop L1 of the first nominal size D1, as shown in FIG. 3, the first loop L1 is formed by moving upward/forward from the two end points D1a and D1b of the first nominal size D1 respectively, turning when meeting an arrow in the process, keeping going straight when meeting circular point and finally meeting at point M1a. The first machining procedure M1 and the second machining procedure M2 through which the first loop L1 passes are defined as a setting machining procedure associated with the first nominal size D1, that is, the specification tolerance ($T_{D1, U}/T_{D1, L}$) of the first nominal size D1 is associated with the predetermined tolerance ($T_{M1, U}/T_{M1, L}$) of the first machining procedure M1 and the predetermined tolerance ($T_{M2, U}/T_{M2, L}$) of the second machining procedure M2. In other words, the values of the predetermined tolerance ($T_{M1, U}/T_{M1, L}$) of the first process M1 and the predetermined tolerance ($T_{M2, U}/T_{M2, L}$) of the second process M2 could determine whether the tolerance of the planned first nominal size D1 or not meets the specification tolerance.

For example, in the second loop L2 of the second nominal size D2, as shown in FIG. 3, the second loop L2 is formed by moving upward/forward from the two end points D2a and D2b of the second nominal size D2 respectively, turning when meeting an arrow in the process, keeping going straight when meeting circular point and finally meeting at point M4b. The fourth machining procedure M4 through which the second loop L2 passes are defined as a setting machining procedure associated with the second nominal size D2, that is, the specification tolerance ($T_{D2, U}/T_{D2, L}$) of the second nominal size D2 is associated with the predetermined tolerance ($T_{M4, U}/T_{M4, L}$) of the fourth machining procedure M4. In other words, the values of the predetermined tolerance ($T_{M4, U}/T_{M4, L}$) of the fourth process M4 could determine whether the tolerance of the planned second nominal size D2 or not meets the specification tolerance.

In step S120, the processing information planner 130 accumulates the predetermined tolerances associated with the specification tolerances of the nominal size to obtain a size cumulative tolerance.

For the first nominal size D1, the predetermined tolerance ($T_{M1, U}/T_{M1, L}$) of the first machining procedure M1 and the predetermined tolerance ($T_{M2, U}/T_{M2, L}$) of the second machining procedure M2 are associated with the specification tolerance ($T_{D1, U}/T_{D1, L}$) of the first nominal size D1, and thus the processing information planner 130 accumulates the related predetermined tolerance ($T_{M1, U}/T_{M1, L}$) of the first machining procedure M1 and the predetermined tolerance ($T_{M2, U}/T_{M2, L}$) of the second machining procedure M2 to obtain the first size cumulative tolerance. After the accumulation, the upper deviation $T_{D1', U}$ of the first size cumulative tolerance is equal to the sum of the upper deviation $T_{M1, U}$ of the first machining procedure M1 and the upper deviation $T_{M2, U}$ of the second machining procedure M2 (that is, $T_{D1', U}=T_{M1, U}+T_{M2, U}$), and the lower deviation $T_{D1', L}$ of the first size cumulative tolerance is equal to the sum of the lower deviation $T_{M1, L}$ of the first machining procedure M1 and the lower deviation $T_{M2, L}$ of the second machining procedure M2 (that is, $T_{D1', L}=T_{M1, L}+T_{M2, L}$).

For the second nominal size D2, the predetermined tolerance ($T_{M4, U}/T_{M4, L}$) of the fourth machining procedure M4 is associated with the specification tolerance ($T_{D2, U}/T_{D2, L}$) of the second nominal size D2, and thus the processing information planner 130 accumulates the related predetermined tolerance ($T_{M4, U}/T_{M4, L}$) of the fourth machining procedure M4 to obtain the second size cumulative tolerance. After the accumulation, the upper deviation $T_{D2', U}$ of the second size cumulative tolerance is equal to the upper deviation $T_{M4, U}$ of the fourth machining procedure M4 (that is, $T_{D2', U}=T_{M4, U}$), and the lower deviation $T_{D2', L}$ of the second size cumulative tolerance is equal to the sum of the lower deviation $T_{M4, L}$ of the fourth machining procedure M4 (that is, $T_{D2', L}=T_{M4, L}$).

In step S125, the processing information planner 130 determines whether the size cumulative tolerance meets the specification tolerance, that is, whether the size cumulative tolerance falls within the specification tolerance is determined.

For example, in the first size cumulative tolerance, the processing information planner 130 determines whether the upper deviation $T_{D1', U}$ of the first size cumulative tolerance meets the upper deviation $T_{D1, U}$ of the specification tolerance of the first nominal size D1, and determines whether the lower deviation $T_{D1', L}$ of the first size cumulative tolerance meets the lower deviation $T_{D1, L}$ of the specification tolerance of the first nominal size D1.

For example, in the second size cumulative tolerance, the processing information planner 130 determines whether the upper deviation $T_{D2', U}$ of the second size cumulative tolerance meets the upper deviation $T_{D2, U}$ of the specification tolerance of the second nominal size D2, and determines whether the deviation $T_{D2', L}$ of the second size cumulative tolerance meets the lower deviation $T_{D2, L}$ of the specification tolerance of the second nominal size D2.

If the size cumulative tolerance meets the specification tolerance, the flow proceeds to step S135; if not, the flow proceeds to step S130.

In step S130, since the size cumulative tolerance does not meet the specification tolerance, the processing information planner 130 re-allocates the associated predetermined tolerance, such that the size cumulative tolerance meets the specification tolerance.

For example, the first size cumulative tolerance is, if the upper deviation $T_{D1', U}$ of the first size cumulative tolerance is outside the upper deviation $T_{D1, U}$ of the specification tolerance of the first nominal dimension D1 or the lower deviation $T_{D1', L}$ of the first size cumulative tolerance is outside the lower deviation $T_{D1, L}$ of the specification tolerance of the first nominal dimension D1, it means that the predetermined tolerance of the first machining procedure M1 and the predetermined tolerance of the second machining procedure M2 associated with the first nominal size D1 might cause the fail of the first nominal size D1 after the first part P1 is completed (that is, the manufactured part has a tolerance of the first nominal size D1, and the tolerance exceeds the range of the specification tolerance). Therefore, the processing information planner 130 re-allocates the predetermined tolerance of the associated first machining procedure M1 and the predetermined tolerance of the second machining procedure M2, such that the first size cumulative tolerance meets the specification tolerance of the first nominal dimension D1.

The processing information planner 130 might re-allocate the predetermined tolerance ($T_{M1, U}/T_{M1, L}$) of the first machining procedure M1 and the predetermined tolerance ($T_{M2, U}/T_{M2, L}$) of the second machining procedure M2 associated with the first nominal size D1 according to the specification tolerance ($T_{D1, U}/T_{D1, L}$) of the first nominal size D1.

In one of the re-allocating methods, the processing information planner 130 might equally allocate the specification tolerance ($T_{D1, U}/T_{D1, L}$) of the first nominal size D1 to the predetermined tolerance ($T_{M1, U}/T_{M1, L}$) of the first process M1 and the predetermined tolerance ($T_{M2, U}/T_{M2, L}$) of the second process M2.

For example, the processing information planner 130 sets half of the upper deviation $T_{D1, U}$ of the first nominal size D1 (that is, $T_{D1, U}/2$) to the upper deviation $T_{M1, U}$ of the predetermined tolerance of the first machining procedure M1 (that is, $T_{M1, U}=T_{D1, U}/2$), also sets half of the upper deviation $T_{D1, U}$ of the first nominal size D1 (that is, $T_{D1, U}/2$) to the upper deviation $T_{M2, U}$ of the predetermined tolerance of the lower machining procedure M2 (that is, $T_{M2, U}=T_{D1, U}/2$), and the processing information planner 130 further sets half of the lower deviation $T_{D1, L}$ of the first nominal size D1 (that is, $T_{D1, L}/2$) to the lower deviation $T_{M1, L}$ of the predetermined tolerance of the first machining procedure M1 (that is, $T_{M1, L}=T_{D1, L}/2$), also sets half of the lower deviation $T_{D1, L}$ of the first nominal size D1 (that is, $T_{D1,L}/2$) to the lower deviation $T_{M2,L}$ of the predetermined tolerance of the second machining procedure M2 (that is, $T_{M2,L}=T_{D1,L}/2$).

In another of re-allocating methods, the processing information planner 130 might, according to a ratio of the machining length of the first machining procedure M1 (that is, the length of the point M1a to the arrow M1b shown in FIG. 3) to the machining length of the second machining procedure M2 (that is, the length of the point M2a to the arrow M2b shown in FIG. 3), allocate the specification tolerance ($T_{D1,U}/T_{D1,L}$) of the first nominal size D1 to the predetermined tolerance ($T_{M1,U}/T_{M1,L}$) of the first machining procedure M1 and the predetermined tolerance ($T_{M2,U}/T_{M2,L}$) of the second machining procedure M2. The ratio of the machining length of the first machining procedure M1 to the machining length of the second machining procedure M2 is 3:2 (the present disclosure is not limited thereto) is taken for example, the processing information planner 130 might set three-fifths of the upper deviation $T_{D1,U}$ of the first nominal size D1 (that is, $T_{D1,U}\times 3/5$) to the upper deviation $T_{M1,U}$ of the predetermined tolerance of the first machining procedure M1 (that is, $T_{M1,U}=T_{D1,U}\times 3/5$), and set two-fifths of the upper deviation $T_{D1,U}$ of the first nominal size D1 (that is, $T_{D1,U}\times 2/5$) to the upper deviation $T_{M2,U}$ of the predetermined tolerance of the second machining procedure M2 (that is, $T_{M2,U}=T_{D1,U}\times 2/5$), and the processing information further sets three-fifths of the lower deviation $T_{D1,L}$ of the first nominal size D1 (that is, $T_{D1,L}\times 3/5$) to the lower deviation $T_{M1,L}$ of the predetermined tolerance of the first machining procedure M1 (that is, $T_{M1,L}=T_{D1,L}\times 3/5$), and set two-fifths of the lower deviation $T_{D1,L}$ of the first nominal size D1 (that is, $T_{D1,L}\times 2/5$) to the lower deviation $T_{M2,L}$ of the predetermined tolerance of the second machining procedure M2 (that is, $T_{M2,L}=T_{D1,L}\times 2/5$).

In addition, the processing information planner 130 might re-allocate the related predetermined tolerances by using the allocating method similar to identical to the foregoing allocating method, such that the second size cumulative tolerance meets the specification tolerance, that is, the second size accumulated tolerance falls within the specification tolerance range.

In another embodiment, the predetermined tolerance of a machining procedure might be associated with a plurality of size cumulative tolerances. In this case, changing the predetermined tolerance of the machining procedure will cause the multiple size cumulative tolerances change together. As a result, it might cause the size cumulative tolerances that originally meet the specification tolerances to become inconsistent with (do not meet) the specification tolerances (that is, the size cumulative tolerances is outside the specification tolerances). In this regard, the processing information planner 130 could list a number of linear simultaneous equations of accumulated tolerances and a plurality of specification tolerances. Using the mathematical linear algebra method, the predetermined tolerances that meet the specification tolerances could be obtained through the linear simultaneous equations.

In step S135, the processing information acquirer 120 obtains a machining allowance of each machining procedure through the setting interface 111. In the present embodiment, as shown in FIG. 3, only the third machining procedure M3 is set with the machining procedure d; however, such exemplification is not meant to be for limiting. Depending on the process, at least one of the several machining procedures might be set to have the same or different machining allowances.

In step S140, the processing information planner 130 uses the dimensional chain establishing technology to establish a dimensional chain loop of the machining allowance d as shown in FIG. 3, and then obtain, from the predetermined tolerances, at least one predetermined tolerance associated with the machining allowance d according to the size chain loop, For example, as shown in FIG. 3, an allowance loop Ld is formed by moving rightward form the right end of the machining allowance d and moving upward/forward from the left end of the machining allowance d, and finally meet at the circular point M4a. The third machining procedure M3 and the fourth machining procedure M4 through which the allowance loop Ld are defined as the setting machining procedures associated with the allowance loop Ld, that is, the machining allowance d is associated with the predetermined tolerance ($T_{M3,U}/T_{M3,L}$) of the third machining procedure M3 and the predetermined tolerance ($T_{M4,U}/T_{M4,L}$) of the fourth machining procedure M4. In other words, the values of the predetermined tolerance ($T_{M3,U}/T_{M3,L}$) of the third machining procedure M3 and the predetermined tolerance ($T_{M4,U}/T_{M4,L}$) of the fourth machining procedure M4 could determine whether the machining allowance d is sufficient (if insufficient, the planned tolerance does not meet the specification tolerance, that is, the planned tolerance is outside the specification tolerance).

In step S145, the processing information planner 130 accumulates the predetermined tolerances associated with the machining allowance d to obtain an allowance cumulative tolerance.

In the present embodiment, associated with the machining allowance d is the predetermined tolerance ($T_{M3,U}/T_{M3,L}$) of the third machining procedure M3 and the predetermined tolerance ($T_{M4,U}/T_{M4,L}$) of the fourth process M4, and thus the processing information planner 130 accumulates the predetermined tolerance ($T_{M3,U}/T_{M3,L}$) of the third machining procedure M3 and the predetermined tolerance ($T_{M4,U}/T_{M4,L}$) of the fourth process M4 to obtain the allowance cumulative tolerance. After the accumulation, the upper deviation $T_{d,U}$ of the allowance cumulative tolerance is equal to the sum of the upper deviation $T_{M3,U}$ of the third machining procedure M3 and the upper deviation $T_{M4,U}$ of the fourth machining procedure M4 (that is, $T_{d,U}=T_{M3,U}+T_{M4,U}$), and the lower deviation $T_{d,L}$ of the allowance cumulative tolerance is equal to the sum of the lower deviation $T_{M3,L}$) of the third machining procedure M3 and the lower deviation $T_{M4,L}$) of the fourth machining procedure M4 (that is, $T_{d,L}=T_{M3,L}+T_{M4,L}$).

In step S150, the processing information planner 130 determines whether the machining allowance d is greater than the allowance cumulative tolerance. If so, the flow proceeds to step S160; if not, the flow proceeds to step S155.

In step S160, when the machining allowance d of the first part P1 is greater than the allowance cumulative tolerance, the processing information planner 130 might perform cost analysis on the first part P1. Before step S160 (as in step S127), the processing information planner 130 might first use the dimensional chain establishing technology to obtain the machining procedure associated with the specification size, perform calculation for sizes of each machining procedure and perform cost analysis according to the sizes of each machining procedure. Furthermore, the cost of the first part P1 changes depending on the number of machining procedures, the machining method of each machining procedure, the predetermined tolerance, the machine number, etc. The processing information planner 130 might, under the condition of minimum cost, propose a modification/ adjustment suggestion for the machining method, the predetermined tolerance and/or the machine number, on the premise that the machining allowance is greater than the allowance cumulative tolerance.

In step S155, machining allowance d is re-adjusted, such that the machining allowance d is greater than the allowance cumulative tolerance. As a result, the machining allowance d is sufficient for the planned tolerance (such as the tolerance of the fourth machining surface S4) to meet the specification tolerance.

In one of the methods for adjusting the machining allowance d, the machining allowance d is set to be equal to or greater than the maximum of the absolute values of the upper deviation $T_{d,U}$ and the absolute value of the lower deviation $T_{d,L}$ regardless of whether the upper deviation $T_{d,U}$ and the lower deviation $T_{d,L}$ of the allowance cumulative tolerance are positive or negative. For example, if the upper deviation $T_{d,L}$ and the lower deviation $T_{d,U}$ of the allowance cumulative tolerance are +0.2 and −0.2, respectively, the processing information planner 130 sets the value of the machining allowance d as the value equal to or greater than absolute value of −0.2, that is, 0.2. If the upper deviation $T_{d,U}$ and the lower deviation $T_{d,L}$ of the allowance cumulative tolerance are −0.2 and −0.5, respectively, the processing information planner 130 sets the value of the machining allowance d as the value equal to or larger than the absolute value of −0.5, that is, 0.5. In addition, when either of the upper deviation and the lower deviation of the allowance cumulative tolerance is not negative, for example, both are positive deviations, the processing information planner 130 sets the value of the machining allowance d as the value greater than zero. For example, if the upper and lower deviations of the allowance cumulative tolerance are +0.5 and +0.2, respectively, the processing information planner 130 sets the value of the machining allowance d to be greater than 0.5, such as 0.6, 0.7 or greater.

In step S160, when the machining allowance d of the first part P1 is greater than the allowance cumulative tolerance, the processing information planner 130 might perform cost analysis on the first part P1. Before step S160 (as in step S152), the processing information planner 130 might first use the dimensional chain establishing technology to obtain the machining procedure associated with the specification size, perform calculation for sizes of each machining procedure and perform cost analysis according to the sizes of each machining procedure. Furthermore, the cost of the first part P1 changes depending on the number of machining procedures, the machining method of each machining procedure, the predetermined tolerance, the machine number, etc. The processing information planner 130 might, under the condition of minimum cost, propose a modification/adjustment suggestion for the machining method, the predetermined tolerance and/or the machine number, on the premise that the machining allowance is greater than the allowance cumulative tolerance. In an embodiment, cost analysis could be performed on the premise that the size cumulative tolerance meets the specification tolerance (the result of step S125 is "YES") and the machining allowance d is greater than the allowance cumulative tolerance (the result of step S150 is "YES"). In another embodiment, cost analysis could also be performed on the premise that one of the two (the result of step S125 and the result of step S150) is "YES".

Although the number of the first part P1 of the foregoing embodiment is exemplified by two nominal sizes, however, in other embodiments, the number of the nominal size of the first part P1 might be one or two, such as three, four or arbitrary number. Furthermore, the structure of the first part P1 of the embodiment of the present disclosure is not limited by FIG. 3, and the first part P1 might have a structure different from that of FIG. 3 depending on the design. Furthermore, in another embodiment, for the same structure of the first part P1 of FIG. 3, the number of the machining procedures, machining direction of each machining procedure, machining length of each machining procedure and/or the machining allowance, etc., could be planned in different way depending on the demand, and the planning is not limited by the foregoing embodiments. In another embodiment, the machining allowance might be omitted if there is no demand.

In summary, the method for part processing planning of the embodiment of the present disclosure is performed by a computer operation, and, in the calculation, the part processing planning system 100 first establishes the dimensional chain loop, finds/obtains the predetermined tolerance associated with the nominal size in the dimensional chain loop of the nominal size, and determines whether the size cumulative tolerance meets the specification tolerance after accumulating the predetermined tolerance associated with the nominal size. In the calculation, the predetermined tolerances of each machining procedure are adjustable, such that each size cumulative tolerance meets the specification tolerances. Such operation must process a large amount of data/information, which cannot be done in an artificial way, and therefore must be performed by computer operations.

Figure 5:
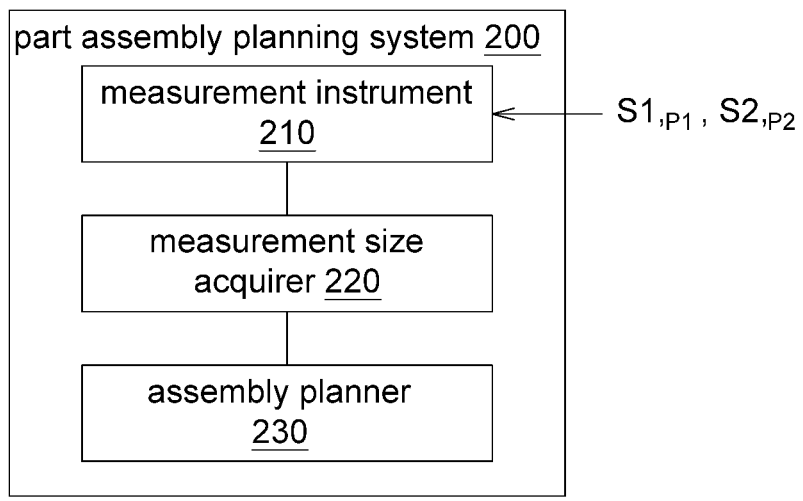
FIG. 5 illustrates a functional block diagram of a part assembly planning system according to an embodiment of the disclosure.
Figure 6:
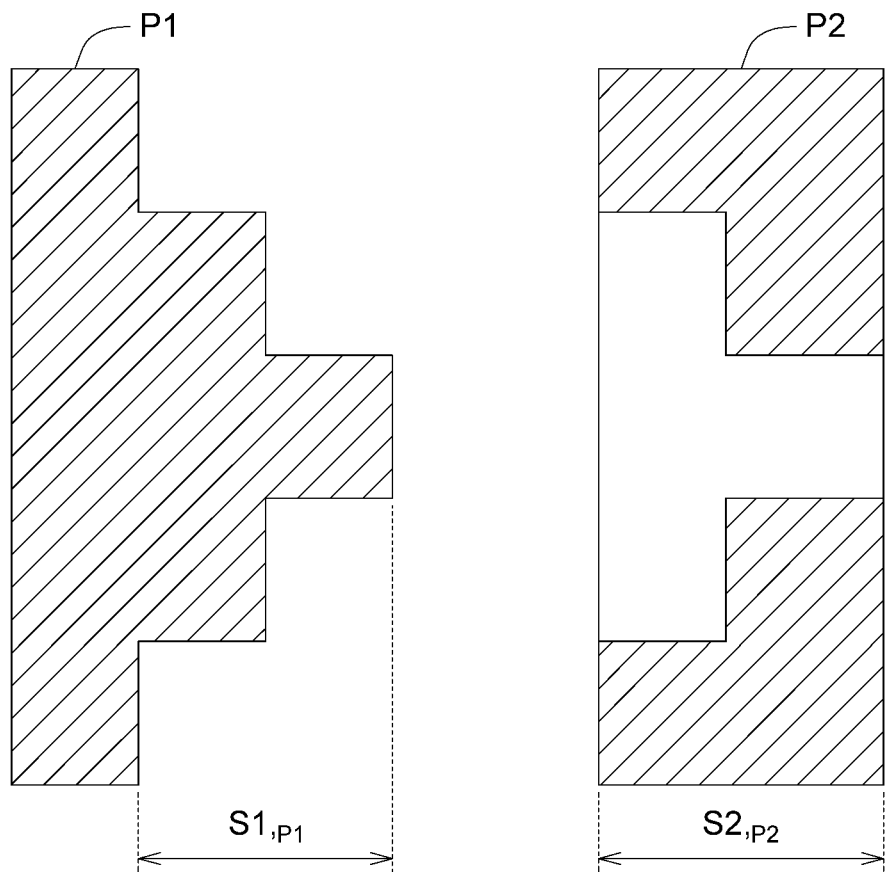
FIG. 6 illustrates the first part and the second part according to an embodiment of the disclosure.
Figure 7:
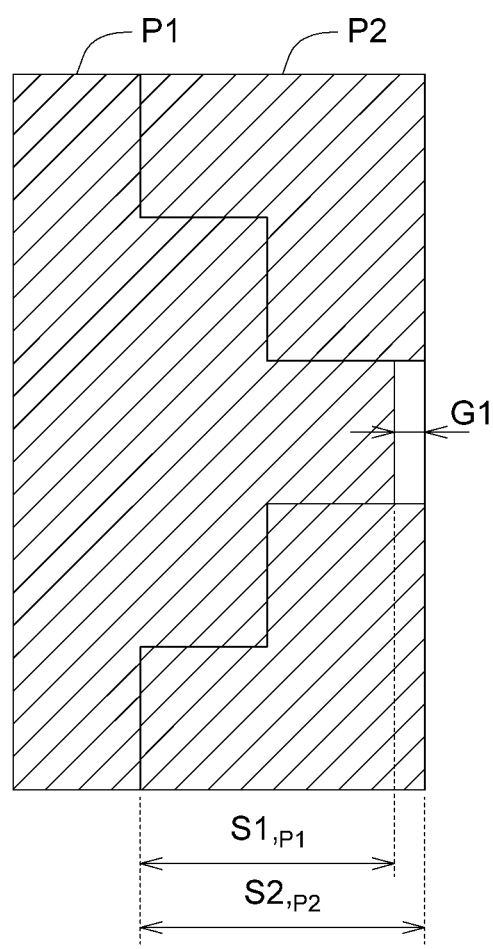
FIG. 7 illustrates a schematic view showing the assembly of the first part and the second part of FIG. 6.
Figure 8A:
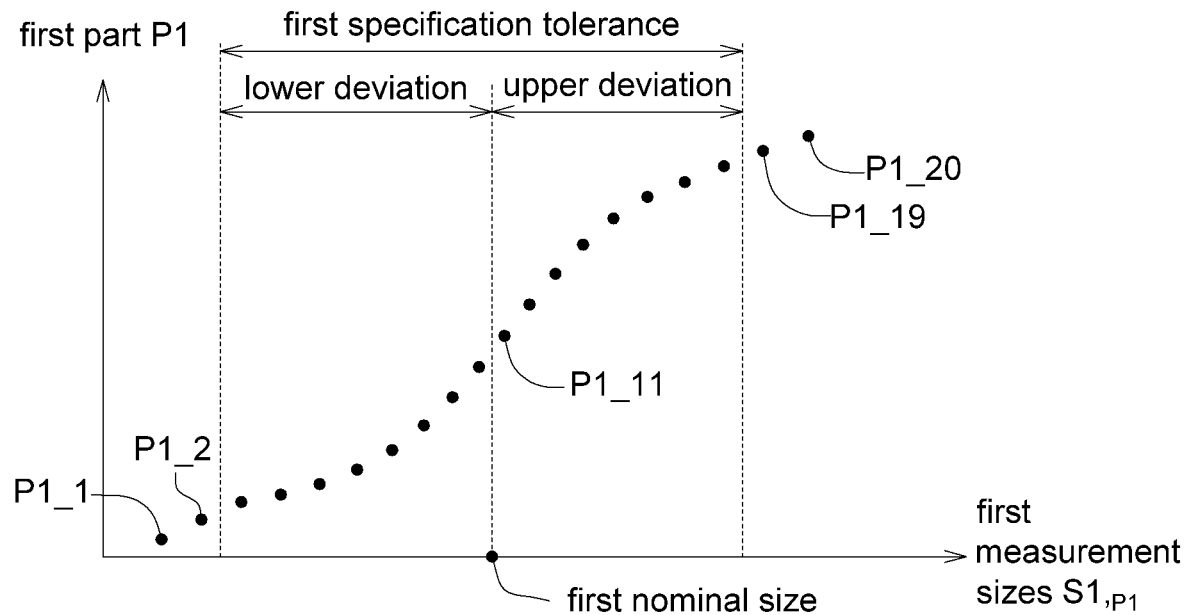
FIG. 8A illustrates a distribution diagram of several first measurement sizes $S1_{,P1}$ of the first parts P1 of FIG. 6.
Figure 8B:
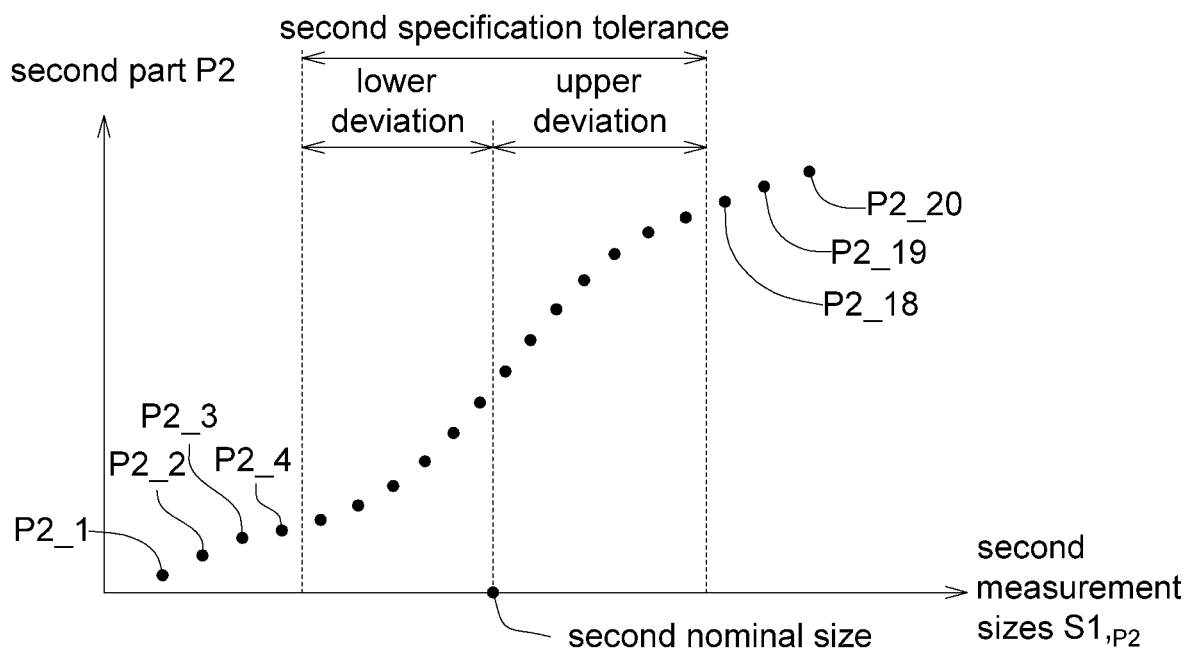
FIG. 8B illustrates a distribution diagram of several second measurement sizes of the second parts P2 of FIG. 6.

Referring to FIGS. 5 to 8, FIG. 5 illustrates a functional block diagram of a part assembly planning system 200 according to an embodiment of the disclosure, FIG. 6 illustrates the first part P1 and the second part P2 according to an embodiment of the disclosure, FIG. 7 illustrates a schematic view showing the assembly of the first part P1 and the second part P2 of FIG. 6, FIG. 8A illustrates a distribution diagram of several first measurement sizes $S1_{,P1}$ of the first parts P1 of FIG. 6, and FIG. 8B illustrates a distribution diagram of several second measurement sizes $S1_{,P2}$ of the second parts P2 of FIG. 6.

In the part assembly planning method of the embodiment, the several first parts P1 and several second parts P2 of the finished/final product are used as planned objects, and not only the first parts P1 and the second parts P2 which are within the specification tolerance range are well (or successfully) fitted, but also some of all of the first parts P1 and the second parts P2 which are outside the specification tolerance range are well fitted. Accordingly, the overall fit rate is increased.

The parts assembly planning system 200 includes a measurement instrument 210, a measurement size acquirer 220 and an assembly planner 230. The measurement instrument 210 is configured to measure the sizes of the first part P1 and the second part P2. The measurement instrument 210 is, for example, various instruments capable of measuring the sizes of the first part P1 and the second part P2, such as a vernier caliper, a centimeter card, a three-dimensional measurement device or other contact or non-contact measurement instrument. The measurement size acquirer 220 and/or the assembly planner 230 is, for example, a circuit structure formed by using semiconductor processes. The measurement size acquirer 220 and the assembly planner 230 could be integrated into a single component, such as a processor, or at least one of the measurement size acquirer 220 and the assembly planner 230 could be integrated into a processor.

Figure 9:
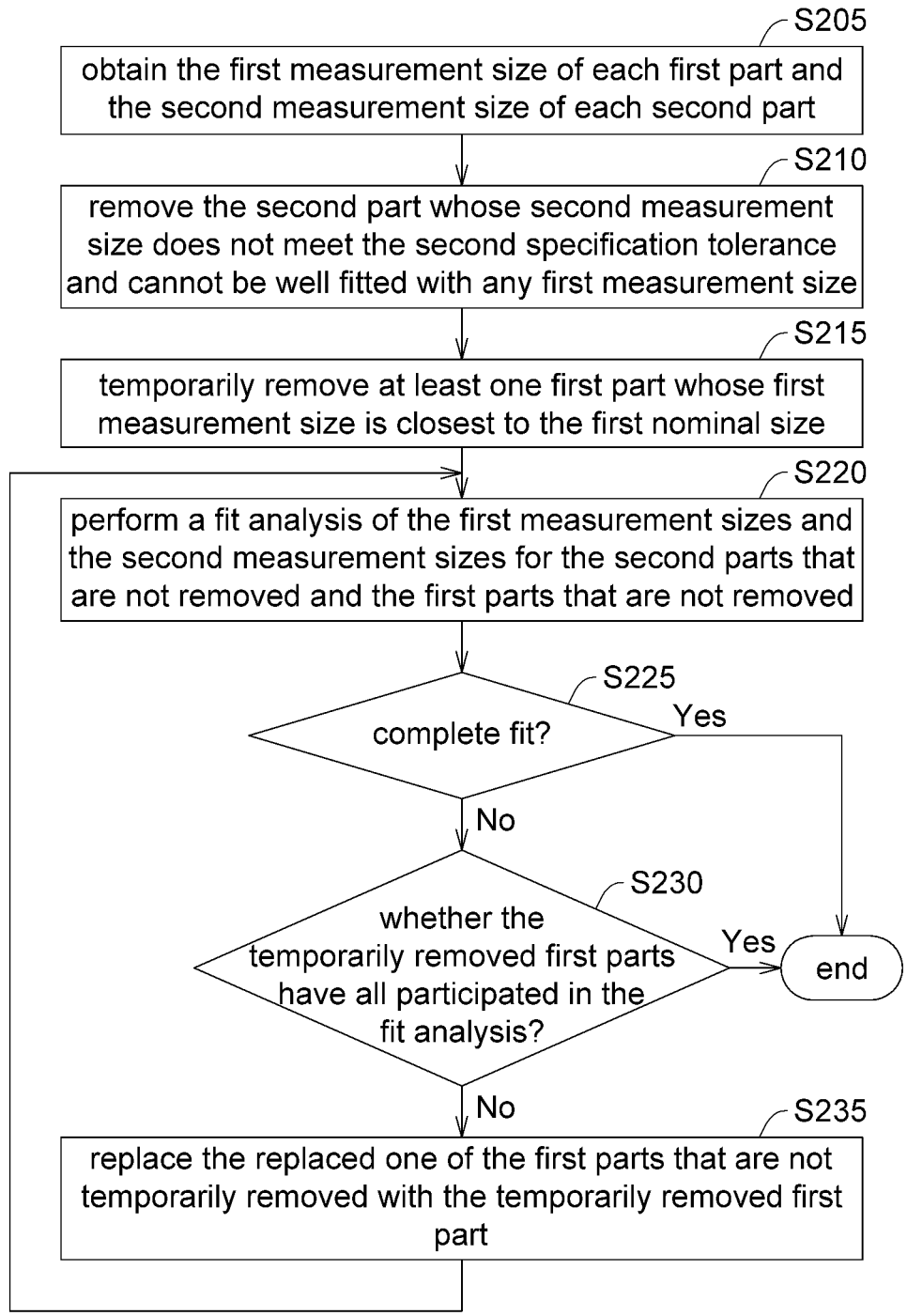
FIGS. 9 and 10 illustrate a process diagram of the part assembly planning method for the part assembly planning system of FIG. 5.

The process diagram of the part assembly planning method for the part assembly planning system 200 of FIG. 5 is described below with reference to FIGS. 9 and 10.

Firstly, the measurement instrument 210 actually measures the first measurement sizes $S1_{,P1}$ of each first part P1 and the second measurement sizes $S1_{,P2}$ of each second parts P2. The first measurement sizes $S1_{,P1}$ and the second measurement sizes $S1_{,P2}$ are mutually matched sizes. The vertical coordinate axis of FIG. 8A represents the numbers of the first parts P1, such as P1_1 to P1_20, which numbered sequentially from bottom to top, and the horizontal coordinate axis represents the first measurement sizes $S1_{,P1}$ of the first parts P1, which are arranged along the positive direction of the horizontal coordinate axis in the order of small to large. The vertical coordinate axis of FIG. 8B represents the numbers of the second parts P2, such as P2_1 to P2_20, which numbered sequentially from bottom to top, and the horizontal coordinate axis represents the second measurement sizes $S1_{,P2}$ of the second parts P2, which are arranged along the positive direction of the horizontal coordinate axis in the order of small to large. As shown in FIGS. 8A and 8B, the number of the first parts P1 and the number of the second parts P2 in the embodiment of the present disclosure are 20 (the number of points in FIGS. 8A and 8B is 20 each), for example. However, the disclosed embodiment does not limit the number of first parts P1 and the number of second parts P2, which might be less than or more than 20.

As shown in FIGS. 8A and 8B, each first part P1 has the same first nominal size and first specification tolerance, and each the second part P2 has the same second nominal size and second specification tolerance. The distribution of several first measurement sizes $S1_{,P1}$ is as shown in FIG. 8A, and the distribution of several second measurement sizes $S1_{,P2}$ is as shown in FIG. 8B, and one point of the figure represents one part. As shown in FIG. 8A, the number of the first parts P1 is exemplified by 20, wherein the first measurement sizes $S1_{,P1}$ of the first parts P1_1, P1_2, P1_19 and P1_20 (such as 4) do not conform to the first specification tolerance, the first measurement sizes $S1_{,P1}$ of the others of the first parts P1 (such as 16) meets the first specification tolerance. As shown in FIG. 8B, the number of the second parts P2 is exemplified by 20, wherein the second measurement sizes $S1_{,P2}$ of the second parts P2_1 to P2_4 and P2_18 to P2_20 (such as 7) do not meet the second specification tolerance, the second measurement sizes $S1_{,P2}$ of the others of the second parts P2 (such as 13) meets the second specification tolerance. The first parts P1 which meet the first specification tolerance and the second parts P2 which meet the second specification tolerance are well fitted, that is, each first part P1 which meets the first specification tolerance could be well fitted with any of the second part which meet the second specification tolerance.

As shown in FIGS. 6 and 7, after the first part P1 is assembled with the second component P2 by the first measurement size $S1_{,P1}$ and the second measurement size $S1_{,P2}$, there is a combination value between the first measurement size $S1_{,P1}$ and the second measurement size $S1_{,P2}$, wherein the combination value must conform to an assembly specification, and it means that the first part P1 is well fitted with the second part P2. If the combination value does not meet the assembly specification, it means that the first part P1 and the second part P2 are not well fitted. In the present embodiment, the combination value is illustrated by taking a gap G1 as an example. In other embodiments, the combination value might be an interference amount or a loose amount of an outer diameter of a shaft and an inner diameter of a hole. When the combination value is the outer diameter of the shaft and the inner diameter of the hole, if the combination value does not comply to the assembly specifications, it means that the shaft cannot be inserted into the hole, or the shaft and the hole are over-loose or over-tight after assembly.

In step S205, the measurement size acquirer 220 obtains the size measured by the measurement instrument 210. For example, the measurement instrument 210 could automatically transmit the measured size value to the measurement size acquirer 220. Alternatively, the manual input mode could be used to input the measured value of the measurement instrument 210 to a setting interface (not illustrated), and then the measurement size acquirer 220 obtains the size value measured by the measurement instrument 210 through the setting interface.

In step S210, the assembly planner 230 rejects/removes the second part P2 whose second measurement size $S1_{,P2}$ does not meet the second specification tolerance and cannot be well fitted with any first measurement size $S1_{,P1}$.

In the present embodiment, the assembly planner 230 uses, for example, a sorting method to sequentially arrange a plurality of first measurement sizes $S1_{,P1}$ from small to large (the distribution of several first measurement sizes $S1_{,P1}$ are shown in FIG. 8A), and sequentially arrange a plurality of second measurement sizes $S1_{,P2}$ from small to large (the distribution of the second measurement sizes $S1_{,P2}$ are shown in FIG. 8B). Then, a maximum difference of the first measurement size $S1_{,P1}$ and the first nominal size (such as the first part P1_20 of FIG. 8A) is used as a reference, and then whether each second part P2 is well fitted with the first part P1_20 is determined. If the second parts P2_1 to P2_3 of FIG. 8B which does not meet the second tolerance specification cannot be well fitted with the first part P1_20, the assembly planner 230 rejects/removes the second parts P2_1 to P2_3. In other words, the assemble planner 230 try to find all the second parts P2 that cannot be well fitted with any second part P2 on the premise of obtaining the largest combination value (such as the largest gap G1 in FIG. 7). If so, the assembly planner 230 rejects/removes such second part P2 that is not adaptable (without assembly significance). In another embodiment, the assembly planner 230 might calculate a plurality of first measurement sizes $S1_{,P1}$ to obtain a first standard deviation, and calculate a plurality of second measurement sizes $S1_{,P2}$ to obtain a second standard deviation. Then, in the range outside +/−3σ (standard deviation), the second part that cannot be well fitted with the first part is searched.

In addition, in above embodiment, searches for the second part that can't be fitted with the first part based on the first part; however, such exemplification is not meant to be for limiting. In another embodiment, searches for the first part that can't be fitted with the second part based on the second part.

In step S215, the assembly planner 230 temporarily removes at least one first part P1 whose first measurement size $S1_{,P1}$ is closest to the first nominal size. In the present embodiment, as shown in FIG. 8A, the first part P1_11 is closest to the first nominal size in all first parts P1. The disclosed embodiment retains the first part P1 having the optimal size (that is, closest to the first nominal size), and it could increase the fit rate of the remaining first parts P1 having poor size with the second parts P2. In another embodiment, the assembly planner 230 might temporarily remove some first parts P1, such as two, three or more, whose first measurement sizes $S1_{,P1}$ are closest to the first nominal size.

In step S220, the assembly planner 230 performs a fit analysis of the first measurement sizes $S1_{,P1}$ and the second measurement sizes $S1_{,P2}$ for the second parts P2 that are not removed and the first parts P1 that are not temporarily removed. In the present embodiment, as shown in FIG. 8A, the assembly planner 230 performs a fit analysis of the first measurement sizes $S1_{,P1}$ and the second measurement sizes $S1_{,P2}$ for the second parts P2 other than the second parts P2_1 to P2_3 (that is, the second parts P2 that are not removed, including the second parts P2 that meet the second specification tolerance and the second parts P2_4 and P2_18 to P2_20 that do not meet the second specification tolerance) and the first parts P1 other than the first part P1_11 (that is, the first parts P1 that are not temporarily removed, including the first parts P1 that meet the first specification tolerance and the first parts P1_1, P1_2, P1_19 and P1_20 that do not meet the first specification tolerance).

In step S225, the assembly planner 230 determines whether the second parts P2 that are not removed and the first parts P1 that are not temporarily removed are completely fitted according to the result of the fit analysis. In the present embodiment, the number of the second parts P2 that are not removed is 17, and the number of the first parts P1 that are not temporarily removed is 19. After the fit analysis, if the 17 (using the smallest number) fit combinations whose combination values all meet the assembly specification, it indicates that the fit result is complete fit, the process ends. If not, the flow proceeds to step S230.

In step S230, the assembly planner 230 determines whether the temporarily removed first parts P1 have all participated in the fit analysis. In the present embodiment, the temporarily removed first part P1_11 has not participated in the fit analysis, and thus the flow proceeds to step S235. If the first parts P1 that have been temporarily removed have all participated in the fit analysis, and then the flow ends.

In step S235, the assembly planner 230 replaces the replaced one of the first parts P1 that are not temporarily removed with the temporarily removed first part P1_11. In an embodiment, the replaced one is the one of the first part P1 that does not meet the first specification tolerance and has the largest difference from the first nominal size. For example, as shown in FIG. 8A, the first part P1_20 is, among the first parts P1 that are not removed, whose first measurement size $S1_{,P1}$ does not meet the first specification tolerance and has the largest difference from the first nominal size. (the larger the difference, the worse the tolerance). Therefore, the assembly planner 230 replaces the second part P2_20 with the temporarily removed first part P1_11. Then, the flow returns to step S220 to perform the fit analysis again. If the number of temporarily removed first parts P1 is greater than one, the assembly planner 230 repeats steps S220 to S230 until all temporarily removed first parts P1 participate in the fit analysis.

Figure 10:
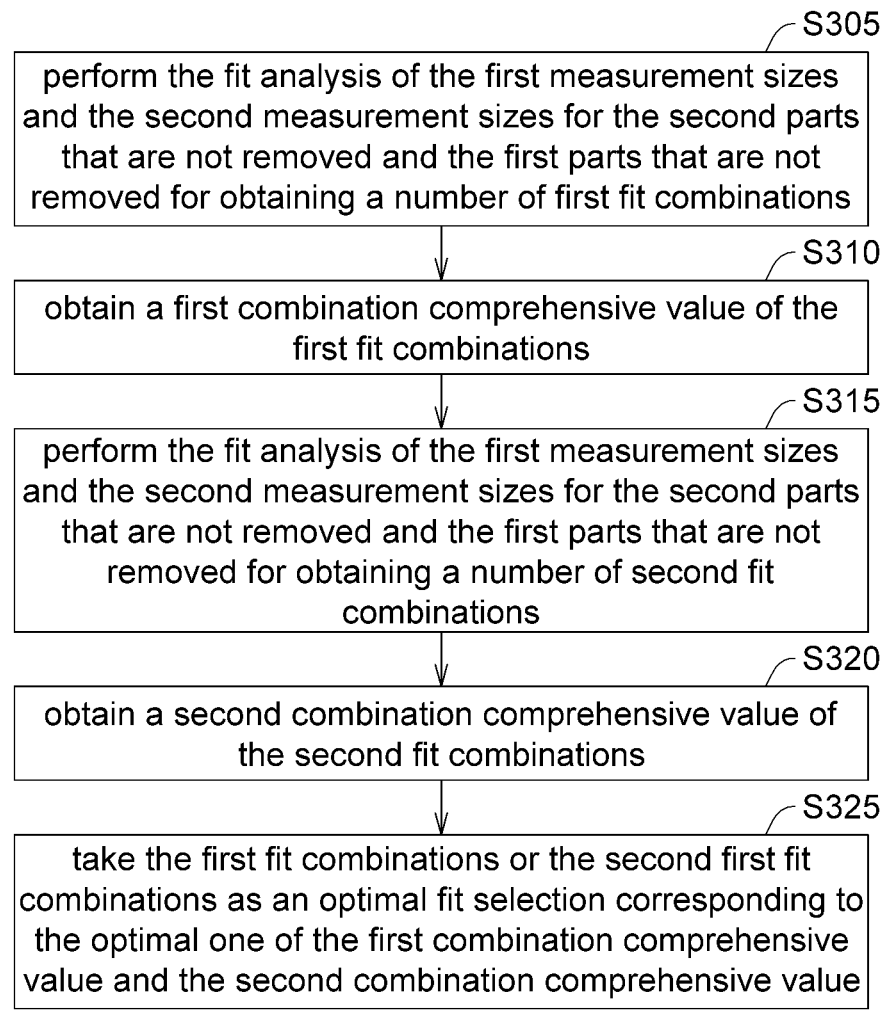

FIG. 10 illustrates an embodiment of the fit analysis (step S220 of FIG. 9) according to the embodiment of the present disclosure. However, the fit analysis of the disclosed embodiment is not limited by the flow of FIG. 10.

In step S305, the assembly planner 230 performs the fit analysis of the first measurement sizes $S1_{,P1}$ and the second measurement sizes $S1_{,P2}$ for the second parts P2 that are not removed and the first parts P1 that are not temporarily removed for obtaining a number of first fit combinations, wherein each first fit combination includes one first part P1 and one second part P2 which are fitted with each other. Each first fit combination is different, that is, the first part P1 of each first fit combination is not repeated to be fitted, while the second part P2 of each first fit combination is not repeated to be fitted. As described above, the number of the first fit combinations in the present embodiment is, for example, 17.

In step S310, the assembly planner 230 obtains a first combination comprehensive value of the first fit combinations. In the present embodiment, the assembly planner 230 obtains one combination value of each first fit combination, calculates the combination values (for example, 17 combination values as described above) to obtain an average value, and the average value serves as the first combination comprehensive value. Alternatively, the assembly planner 230 takes the largest, the smallest or other reference values of the combination value as the first combination comprehensive value.

In step S315, the assembly planner 230 performs the fit analysis of the first measurement sizes $S1_{,P1}$ and the second measurement sizes $S1_{,P2}$ for the second parts P2 that are not removed and the first parts P1 that are not temporarily removed for obtaining a number of second fit combinations, wherein each second fit combination includes one first part P1 and one second part P2 which are well fitted with each other. Each first fit combination is different, and the first fit combinations are not completely the same as the second fit combinations.

In step S320, the assembly planner 230 obtains a second combination comprehensive value of the second fit combinations. As described above, the number of the first fit combinations is 17, for example. Each second fit combination includes one first part P1 and one second part P2. In the present embodiment, the assembly planner 230 obtains one combination value of each second fit combination, calculates the combination values (for example, 17 combination values as described above) to obtain an average value, and the average value serves as the second combination comprehensive value. Alternatively, the assembly planner 230 takes the largest, the smallest or other reference values of the combination value as the second combination comprehensive value.

In step S325, the assembly planner 230 takes the first fit combinations or the second fit combinations, corresponding to the optimal one of the first combination comprehensive value and the second combination comprehensive value, as an optimal fit selection. The first combination comprehensive value and the second combination comprehensive value both meet the assembly specifications. The above-mentioned optimal one is, for example, the combination comprehensive value which is closest to the optimal specification of the assembly specifications, wherein the optimal specification is an intermediate value of the range of assembly specifications.

Then, in an actual assembly process, the assembler could assemble the first part P1 and the second parts P2 according to the aforementioned optimal fit selection.

In addition, in the present embodiment, the assembly planner 230 obtains two combination comprehensive values (two iterations) as an example. However, in other embodiments, the assembly planner 230 could obtain more combination comprehensive values (more iterations), and then takes some fit combinations, corresponding to the optimal one of the combination comprehensive values, as an optimal fit selection. Alternatively, if the first part P1 and the second part P2 could be completely fitted in the first iteration, the assembly planner 230 could take fit combinations, corresponding to the combination comprehensive values in first iteration, as an optimal fit selection.

Although the part assembly planning method of the aforementioned embodiment is exemplified by the fit analysis of two parts, in another embodiment, the fit analysis could be performed for three or more parts simultaneously. Although the assembly size of the two parts of the aforementioned embodiment is described by taking one combination (such as the first measurement size $S1_{,P1}$ and the second measurement size $S1_{,P2}$) as an example, in another embodiment, the fit analysis could be performed for more combinations simultaneously. The disclosed embodiments do not limit the number of parts to be fitted and/or the number of the combinations of any two parts.

In summary, in the part assembly planning method of the embodiment, the first parts and the second parts of the finished/final product are used as planning objects, not only it allows the first parts and the first parts within the specification tolerance range to be fitted, but also further allows the first parts and the first parts outside the specification tolerance range to be partly or even completely fitted, and accordingly it increases the overall fit rate. In addition, after measuring the sizes/dimensions, the assembly planning steps of FIGS. 9 and 10 are all performed by computer operations. Such operation must process a large amount of data and cannot be done in an artificial method. Thus, it must be performed by computer operations or machine operation.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A part processing planning method, performed by computer operations, comprises:
    obtaining a specification tolerance of a nominal size of a part;
    obtaining a predetermined tolerance of each of a plurality of machining procedures;
    from the predetermined tolerances, obtaining at least one of the predetermined tolerances associated with the specification tolerance by using a dimensional chain establishing technology;
    accumulating the at least one of the predetermined tolerances associated with the specification tolerances to obtain a size cumulative tolerance;
    determining whether the size cumulative tolerance meets the specification tolerance; and
    re-allocating the associated predetermined tolerance when the size cumulative tolerance does not meet the specification tolerance, such that the size cumulative tolerance meets the specification tolerance.

2. The part processing planning method according to claim 1, further comprises:
    obtaining a machining allowance;
    from the predetermined tolerances, obtaining at least one of the predetermined tolerances associated with the machining allowance by using the dimensional chain establishing technology;
    accumulating the at least one of the predetermined tolerances associated with the machining allowance to obtain an allowance cumulative tolerance;
    determining whether the machining allowance is greater than the allowance cumulative tolerance;
    re-adjusting the machining allowance when the machining allowance is greater than the allowance cumulative tolerance, such that the machining allowance is greater than the allowance cumulative tolerance.

3. The part processing planning method according to claim 2, further comprises:
    setting the machining allowance to be equal to the maximum one of absolute value of an upper deviation of the allowance cumulative tolerance and absolute value of a lower deviation of the allowance cumulative tolerance.

4. The part processing planning method according to claim 2, further comprises:
    determining whether any of an upper deviation of the allowance cumulative tolerance and a lower deviation of the allowance cumulative tolerance is negative; and
    setting the machining allowance to be greater than zero when any of the upper deviation of the allowance cumulative tolerance and the lower deviation of the allowance cumulative tolerance is not negative.

5. The part processing planning method according to claim 1, wherein step of obtaining the at least one of the predetermined tolerances associated with the specification tolerance by using the dimensional chain establishing technology further comprises:
    obtaining the at least one of the predetermined tolerances associated with the specification tolerance by using a loop method.

6. A part processing planning system comprises:
    a processing information acquirer configured to:
    obtain a specification tolerance of a nominal size of a part; and
    obtain a predetermined tolerance of each of a plurality of machining procedures; and
    a processing information planner configured to:
    from the predetermined tolerances, obtain at least one of the predetermined tolerances associated with the specification tolerance by using a dimensional chain establishing technology;
    accumulate the at least one of the predetermined tolerances associated with the specification tolerances to obtain a size cumulative tolerance;
    determine whether the size cumulative tolerance meets the specification tolerance; and
    re-allocate the associated predetermined tolerance when the size cumulative tolerance does not meet the specification tolerance, such that the size cumulative tolerance meets the specification tolerance.

7. The part processing planning system according to claim 6, whether the processing information acquirer is further configured to obtain a machining allowance; the processing information planner is further configured to:
    from the predetermined tolerances, obtain at least one of the predetermined tolerances associated with the machining allowance by using the dimensional chain establishing technology;
    accumulate the at least one of the predetermined tolerances associated with the machining allowance to obtain an allowance cumulative tolerance;
    determine whether the machining allowance is greater than the allowance cumulative tolerance;
    re-adjust the machining allowance when the machining allowance is greater than the allowance cumulative tolerance, such that the machining allowance is greater than the allowance cumulative tolerance.

8. The part processing planning system according to claim 7, wherein the processing information planner is further configured to:
    set the machining allowance to be equal to or greater than the maximum one of absolute value of an upper deviation of the allowance cumulative tolerance and absolute value of a lower deviation of the allowance cumulative tolerance.

9. The part processing planning system according to claim 7, wherein the processing information planner is further configured to:

determine whether any of an upper deviation of the allowance cumulative tolerance and a lower deviation of the allowance cumulative tolerance is negative; and set the machining allowance to be greater than zero when any of the upper deviation of the allowance cumulative tolerance and the lower deviation of the allowance cumulative tolerance is not negative.

10. The part processing planning system according to claim 6, wherein the processing information planner is further configured to:

obtain the at least one of the predetermined tolerances associated with the specification tolerance by using a loop method.

11. A part assembly planning method, performed by computer operations, comprises:

obtaining a first measurement size of each of a plurality of first parts and a second measurement size of each of a plurality of second parts, wherein each first part has the same first nominal size and the same first specification tolerance, and each second part has the same second nominal size and the same second specification tolerance;

removing the second part whose second measurement size does not meet the second specification tolerance and cannot be fitted with any first measurement size;

temporarily removing the first part whose first measurement size is closest to the first nominal size; and performing a fit analysis of the first measurement sizes and the second measurement sizes for the second parts that are not removed and the first parts that are not temporarily removed;

wherein step of performing the fit analysis of the first measurement sizes and the second measurement sizes for the second parts that are not removed and the first parts that are not temporarily removed comprises:

performing the fit analysis of the first measurement sizes and the second measurement sizes for the second parts that are not removed and the first parts that are not temporarily removed for obtaining a plurality of first fit combinations, wherein each first fit combination comprises the first part and the second part which are fitted with each other, and each first fit combination is different;

obtaining a first combination comprehensive value of the first fit combinations;

performing the fit analysis of the first measurement sizes and the second measurement sizes for the second parts that are not removed and the first parts that are not temporarily removed for obtaining a plurality of second fit combinations, wherein each second fit combination comprises the first part and the second part which are fitted with each other, each second fit combination is different, and the second fit combinations are not completely the same as the first fit combinations;

obtaining a second combination comprehensive value of the second fit combinations; and take the first fit combinations or the second fit combinations, corresponding to the optimal one of the first combination comprehensive value and the second combination comprehensive value, as an optimal fit selection.

12. The part assembly planning method according to claim 11, wherein in step of performing the fit analysis of the first measurement sizes and the second measurement sizes for the second parts that are not removed and the first parts that are not temporarily removed, when the second parts that are not removed are not completely fitted with the first parts that are not temporarily removed, the part assembly planning method further comprises:

replacing a replaced one of the first parts that are not temporarily removed with the temporarily removed first part;

re-performing the fit analysis.

13. The part assembly planning method according to claim 12, wherein in step of replacing one of the first parts that are not temporarily removed with the temporarily removed first part, the replaced one is the first part which does not meet the first specification tolerance and has the maximum difference from the first nominal size.

14. A part assembly planning system, comprising:

a measurement size acquirer configured to obtain a first measurement size of each of a plurality of first parts and a second measurement size of each of a plurality of second parts, wherein each first part has the same first nominal size and the same first specification tolerance, and each second part has the same second nominal size and the same second specification tolerance;

an assembly planner configured to:

remove the second part whose second measurement size does not meet the second specification tolerance and cannot be fitted with any first measurement size;

temporarily remove the first part whose first measurement size is closest to the first nominal size; and perform a fit analysis of the first measurement sizes and the second measurement sizes for the second parts that are not removed and the first parts that are not temporarily removed;

wherein the assembly planner is configured to:

perform the fit analysis of the first measurement sizes and the second measurement sizes for the second parts that are not removed and the first parts that are not removed for obtaining a plurality of first fit combinations, wherein each first fit combination comprises the first part and the second part which are fitted with each other, and each first fit combination is different;

obtain a first combination comprehensive value of the first fit combinations;

perform the fit analysis of the first measurement sizes and the second measurement sizes for the second parts that are not removed and the first parts that are not removed for obtaining a plurality of second fit combinations, wherein each second fit combination comprises the first part and the second part which are fitted with each other, each second fit combination is different, and the second fit combinations are not completely the same as the first fit combinations;

obtain a second combination comprehensive value of the second fit combinations; and take the first fit combinations or the second fit combinations, corresponding to the optimal one of the first combination comprehensive value and the second combination comprehensive value, as an optimal fit selection.

15. The part assembly planning system according to claim 14, wherein when the second parts that are not removed are not completely fitted with the first parts that are not temporarily removed, the assembly planner is configured to:

replace a replaced one of the first parts that are not temporarily removed with the temporarily removed first part; and re-performing the fit analysis.

16. The part assembly planning system according to claim 15, wherein the replaced one is the first part which does not meet the first specification tolerance and has the maximum difference from the first nominal size.

17. A non-transitory computer readable medium storing a program causing a part processing planning system to execute a part processing planning method, the part processing planning method comprises:
   obtaining a specification tolerance of a nominal size of a part;
   obtaining a predetermined tolerance of each of a plurality of machining procedures;
   from the predetermined tolerances, obtaining at least one of the predetermined tolerances associated with the specification tolerance by using a dimensional chain establishing technology;
   accumulating the at least one of the predetermined tolerances associated with the specification tolerances to obtain a size cumulative tolerance;
   determining whether the size cumulative tolerance meets the specification tolerance; and
   re-allocating the associated predetermined tolerance when the size cumulative tolerance does not meet the specification tolerance, such that the size cumulative tolerance meets the specification tolerance.

18. A non-transitory computer readable medium storing a program causing a part assembly planning to execute a part assembly planning method, the part assembly planning method comprises:
   obtaining a first measurement size of each of a plurality of first parts and a second measurement size of each of a plurality of second parts, wherein each first part has the same first nominal size and the same first specification tolerance, and each second part has the same second nominal size and the same second specification tolerance;
   removing the second part whose second measurement size does not meet the second specification tolerance and cannot be fitted with any first measurement size;
   temporarily removing the first part whose first measurement size is closest to the first nominal size; and
   performing a fit analysis of the first measurement sizes and the second measurement sizes for the second parts that are not removed and the first parts that are not temporarily removed for obtaining a plurality of first fit combinations, wherein each first fit combination comprises the first part and the second part which are fitted with each other, and each first fit combination is different;
wherein the part assembly planning method further comprises:
obtaining a first combination comprehensive value of the first fit combinations;
performing the fit analysis of the first measurement sizes and the second measurement sizes for the second parts that are not removed and the first parts that are not removed for obtaining a plurality of second fit combinations, wherein each second fit combination comprises the first part and the second part which are fitted with each other, each second fit combination is different, and the second fit combinations are not completely the same as the first fit combinations;
obtaining a second combination comprehensive value of the second fit combinations; and
taking the first fit combinations or the second fit combinations, corresponding to the optimal one of the first combination comprehensive value and the second combination comprehensive value, as an optimal fit selection.

* * * * *